2,885,399
Patented May 5, 1959

2,885,399
HYDRAZINIUM HEXAFLUOROPHOSPHATE SALTS

George M. Omietanski, Grand Island, N.Y., assignor to The Ohio State University Research Foundation, Columbus, Ohio No Drawing. Application March 4, 1957
Serial No. 643,492

11 Claims. (Cl. 260—247.5)

This invention relates to cationic organic hydrazine derivatives. In one specific aspect, it relates to a novel class of compounds useful for characterizing hydrazinium salts. In another aspect, it relates to new hydrazinium hexafluorophosphate derivatives.

This application is a continuation-in-part of my co-pending applications S.N. 632,942, filed January 7, 1957, and S.N. 582,657, filed May 4, 1956, which, in turn, are continuations-in-part of my application S.N. 544,091, filed October 31, 1955, now abandoned. In my co-pending applications I disclosed a novel method for preparing hydrazinium chlorides comprising reacting chloramine with a broad class of tertiary amines to form the corresponding hydrazinium chloride and working up the reaction mixture to obtain a pure product. The chloramine tertiary amine reaction is immense in scope; accordingly, by this method novel compounds having wide structural variation have been made available. The uses of this variety of compounds are described in great detail in my co-pending applications, supra. Such uses include commercial application as bacteriocides, detergents, polymerization initiators, catalysts, antihistaminics, anti-spasmodics, curarimimetics, and a wide range of intermediates.

When a vast number of new compounds having a common structural characteristic is being prepared it is frequently necessary to convert them to pure crystalline derivatives for purposes of structural identification. The hydrazinium salts, e.g. the chlorides, fall within this category. To characterize these salts, I have found it necessary to find a unique derivative of high molecular weight which would retain the hydrazinium cation. In such a case it is obvious that a small amount of unknown will be converted with appropriate treatment to a large amount of derivative. Common characterizing reagents for similar purposes include chloroplatinic acid, potassium chloroplatinate and potassium mercuri-iodide. The use of such reagents for characterizing my novel hydrazinium salts is subject to an unfortunate limitation. They do not give, when admixed with a hydrazinium salt, a unique derivatizing reaction. Instead, such reagents give water insoluble salts with the common impurities of the hydrazinium salts, viz: amines, amine hydrochlorides, and ammonium chloride, as well as with the hydrazinium salt selected for characterization. I have discovered that the hydrazinium salts may be effectively characterized by converting them to their hexafluorophosphate derivatives. The hexafluorophosphate reagents such as $KPF_6$ and $HPF_6$ do not even yield water insoluble salts with ammonium chloride, which is the major impurity in many hydrazinium chlorides made by the chloramine tertiary amine reaction. Rather, they tend to form, in aqueous solution, water insoluble to slightly soluble crystalline solids of sharp melting points containing the hydrazinium cation.

As characterizing compounds the hexafluorophosphates have additional advantages. They are less hygroscopic than, e.g. hydrazinium chlorides, and they are more readily insolated. They require less unknown than the standard reagents described hereabove. Moreover, they are useful in combustion analysis, since the added elements, phosphorus and fluorine, make it easier to establish an empirical formula. In quantitative analysis the water insolubility of certain hexafluorophosphates offers a method for direct gravimetric determination of the hydrazinium structure.

Certain of the hydrazinium hexafluorophosphates, notably the hydroxyalkyl and benzylideneaminoloweralkyl types, are appreciably more soluble in water. The use of such compounds in electroplating will be discussed infra.

It is, therefore, an object of the present invention to provide a novel class of compounds having definitive melting points, crystal habits, X-ray diffraction patterns and elemental analyses which make them suitable in proving the identity of unknown hydrazinium salts. It is a further object of this invention to provide a new class of hydrazinium hexafluorophosphates useful in characterizing, in electroplating and for other purposes.

In accordance with the present invention I have discovered a new generic class of chemical compounds of the following structural formula:

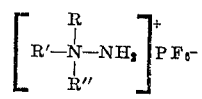

In the formula the substituents represented by R, R' and R'' are these. R is an aliphatic hydrocarbon residue having less than 25 carbon atoms. Such residues may be defined more specifically as alkyl, alkenyl and alkadienyl radicals having the indicated chain length. R may also be phenyl, loweralkylphenyl, cyclohexyl, primaryaminoloweralkyl, cyanoloweralkyl and benzylideneaminoloweralkyl. R' may be an aliphatic hydrocarbon residue having less than 25 carbon atoms as described hereabove. Both R' and R'' may be hydroxyloweralkyl radicals or carbon containing residues, which when taken collectively with each other represent the necessary atoms to complete a heterocyclic ring structure having at least 5 and not more than 6 endocyclic atoms. In addition R'' may be a lower alkyl radical.

The methods of preparing the novel compounds of the present invention are three, viz: (1) metathesis, (2) neutralization and (3) addition.

For purposes of the metathetical reaction it is generally convenient to use the hydrazinium chlorides as a starting material since they are the most readily available of the hydrazinium salts. Metathesis is most effectively run in aqueous solutions, according to Equation (1) shown hereunder:

(1)
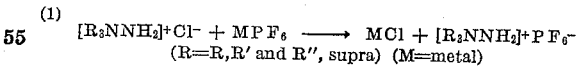

This method involves treating a concentrated aqueous solution of a particular hydrazinium salt, e.g. a chloride, with a saturated aqueous solution of a metallic hexafluorophosphate. I have found $KPF_6$ to be eminently suitable as a reagent, since it is stable, relatively inexpensive and readily accessible. The hydrazinium hexafluorophosphate salt generaly precipitates out quickly as a crystalline solid. In lieu of $KPF_6$ hexafluorophosphoric acid can be used, but a greater quantity is required to obtain a pure sample because of hydrolysis of $HPF_6$ to mixed fluorine, phosphorus and oxygen-containing acids in slow equilibrium reactions. The metathesis could be accomplished in other than aqueous solution, but with relatively little advantage.

Neutralization of a hydrazinium hydroxide to form the hexafluorophosphate derivative is shown below in Equation 2.

(2)
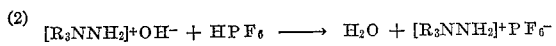

Generally this reaction is less desirable than metathesis since it is often necessary to make the hydrazinium hydroxide by the method of Equation 3 below:

(3)
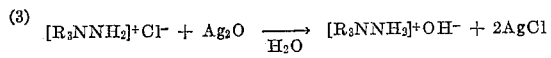

Hydrazinium hydroxides are strong bases which are unstable to heat. In fact, aqueous solutions of some of these compounds decompose at about 60° C. They are, however, readily neutralized by strong acids such as $HPF_6$. $HPF_6$ is commercially available in 65% strength as a clear, colorless fuming liquid, containing, in addition, about 6% HF, 8% mixed phosphorus, oxygen and fluorine-containing acids and water. Dilution to even 50% $HPF_6$ gives far more hydrolysis to the phosphorus, oxygen and fluorine-containing acids. $HPF_6$ dissociates like $H_2SiF_6$ on heating. It recombines when cold; therefore, it may appear distillable. The preferred method for neutralization is to add acid as concentrated as possible to concentrated hydrazinium hydroxides with good cooling and good stirring.

The addition reaction, Equation 4, requires a betaine, e.g. a phenolic or carboxy type of hydrazinium salt:

(4)
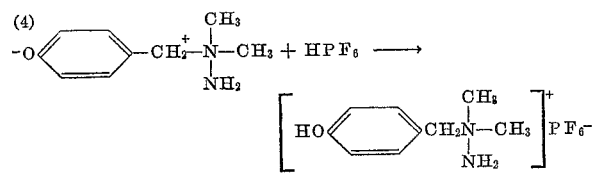

The hexafluorophosphates derived from some betaines are stable only in the presence of excess acid.

I have already indicated that the hydrazinium hexafluorophosphates are generally water insoluble to slightly soluble crystalline solids of sharp melting point. They are generally recrystallizable from water or polar organic solvents. Water solubility is often a function of cationic structure; e.g. the tri-n-propyl and trimethyl hydrazinium cations will give water insoluble hexafluorophosphates, but those $PF_6^-$ compounds made from dimethylhydroxypropyl hydrazinium cations are more water soluble. In general, the physical properties, crystallization habits, and solubility characteristics of the hexafluorophosphates show similarity to the corresponding perchlorates, with two major differences. First, certain perchlorates are explosive; the $PF_6^-$ compounds are not. Second, the $PF_6^-$ compounds are hydrolyzable in acid media to HF and phosphorus, oxygen and fluorine-containing acids. The hydrazinium hexafluorophosphates are readily obtained pure. They give about neutral pH in saturated aqueous solution. Some hydrazinium hexafluorophosphates are soluble in excess $KPF_6$ solution.

I have indicated that the preferred method of preparing the hydrazinium hexafluorophosphates involves the metathetical reaction of a hydrazinium salt with a saturated aqueous solution of $KPF_6$. By this method the $PF_6^-$ derivative is obtained in good to excellent yields in the form of crystalline, non-hygroscopic, readily recrystallizable salts. The $PF_6^-$ compounds have characteristic, excellently reproducible crystal habits and melting points.

The present invention is further illustrated by the following examples.

*Example I*

An aqueous solution of 1,1,1-trimethylhydrazinium chloride, prepared by reacting monochloramine with trimethylamine according to the method fully described in my co-pending application S.N. 632,942 was admixed in aqueous solution with a saturated aqueous solution of potassium hexafluorophosphate. A non-hygroscopic, crystalline solid formed during the course of the reaction. Upon separation the novel 1,1,1-trimethyl-hydrazinium hexafluorophosphate was obtained, having a melting point of about 300° C. with decomposition. The elemental analysis of this new salt compared with theory as follows: percent C, calculated 16.36, found, 16.41; percent H, calculated 5.04, found 5.05; percent N, calculated 12.72, found, 12.55; percent P, calculated 14.07, found 14.02.

*Example II*

The procedure of Example I was substantially repeated selecting 1,1-diethyl-1-phenylhydrazinium chloride as the salt to be characterized. Upon work-up the hexafluorophosphate derivative was found to have a melting point of 210–211° C. The elemental analysis, as compared with theory, was as follows: percent C, calculated 38.71, found, 38.48; percent H, calculated 5.52, found, 5.59; percent N, calculated 9.03, found, 8.85; percent P, calculated 9.98, found 9.94.

*Example III*

The procedure of Example I was substantially repeated selecting 1,1-dimethyl-1-phenylhydrazinium chloride as the salt to be characterized. The hexafluorophosphate derivative had a melting point of 165–166° C. The elemental analysis as compared with theory was as follows: percent C, calculated 34.05, found, 34.29; percent H, calculated 4.64, found, 4.76; percent N, calculated 9.93, found, 9.80; percent P, calculated 10.98, found 10.78.

*Example IV*

The procedure of Example I was substantially repeated selecting 1,1,1-tri-n-propylhydrazinium chloride as the salt to be characterized. The hexafluorophosphate, after recrystallization from a water-acetone mixture had a melting point of 202.5 to 203.5° C. The elemental analysis compared with theory as follows: percent C, calculated 35.52, found, 35.50; percent H, calculated 7.62, found, 7.77; percent N, calculated 9.21, found, 9.34; percent P, calculated 10.17, found 9.97.

*Example V*

The procedure of Example I was substantially repeated selecting 1,1,1-tri-n-butylhydrazinium chloride as the salt to be characterized. The hexafluorophosphate derivative was recrystallized from an alcohol-water mixture. Its elemental analysis, when compared with theory was as follows: percent C, calculated 41.67, found, 41.77; percent H, calculated 8.44, found, 8.54; percent N, calculated 8.09, found 8.26; percent P, calculated 8.94, found, 9.02.

*Example VI*

The procedure of Example I was substantially repeated selecting as hydrazinium salt to be characterized 1,1-di-n-propyl-1-phenylhydrazinium chloride. The hexafluorophosphate derivative appeared as pale green crystals melting at 135–136° C. The elemental analysis of this new compound when compared to theory was as follows: percent C, calculated 42.60, found, 42.54; percent H, calculated 6.26, found, 6.41; percent N, calculated 8.28, found, 8.29; percent P, calculated 9.15, found, 9.22.

*Example VII*

The procedure of Example I was substantially repeated selecting 1,1-dimethyl-1-(p-tolyl)hydrazinium chloride as the salt to be characterized. The hexafluorophosphate derivative had a melting point of 120–121° C. Its elemental analysis compared with theory as follows: percent C, calculated 36.49, found, 36.67; percent H, calculated 5.10, found, 5.25; percent N, calculated 9.46, found, 9.39; percent P, calculated 10.46, found, 10.46.

*Example VIII*

The procedure of Example I was substantially repeated in order to characterize 1,1,1-tri-n-hexylhydrazinium chloride. The hexafluorophosphate derivative was recrystallized from an alcohol-water mixture to give a novel compound having a melting point of 80–81° C. The elemental analysis when compared with theory was as follows: percent C, calculated 50.22, found, 50.22; percent H, calculated 9.60, found, 9.54; percent N, calculated 6.51, found, 6.44; percent P, calculated 7.19, found, 7.26.

*Example IX*

1-cyclohexyl-1-diethylhydrazinium chloride was treated in aqueous solution with potassium hexafluorophosphate. The $PF_6$ derivative was recrystallized from an alcohol-water mixture to give a novel salt melting at 128–129° C. The elemental analysis of this new compound when compared with theory was as follows: percent C, calculated 37.97, found, 38.21; percent H, calculated 7.33, found, 7.44; percent N, calculated 8.86, found, 8.82; percent P, calculated 9.79, found, 9.76.

*Example X*

4-amino-4-methyl-morpholinium chloride was converted to its characteristic hexafluorophosphate by the procedure of Example I. The novel derivative was recrystallized from an alcohol-acetone mixture to give white crystals melting at about 300° C. with decomposition. These crystals had an elemental analysis which compared with theory as follows: percent C, calculated 22.91, found, 22.80; percent H, calculated 5.00, found, 5.20; percent N, calculated 10.69, found, 10.55; percent P, calculated 11.82, found, 11.99.

*Example XI*

A methanol-water solution of 1,1,1-tri-n-heptylhydrazinium chloride was treated with a saturated aqueous solution of potassium hexafluorophosphate. An immediate white precipitate formed within the reaction mixture. Upon separation this novel compound was found to have a melting point of 98–99° C. Its elemental analysis compared with theory is as follows: percent C, calculated 53.37, found, 53.32; percent H, calculated 10.02, found, 9.98; percent N, calculated 5.93, found, 5.88; percent P, calculated 6.55, found, 6.62.

*Example XII*

1,1-dimethyl-1-(2-cyanoethyl)hydrazinium chloride was dissolved in water and treated with an aqueous solution of potassium hexafluorophosphate. The resulting derivative after separation from the reaction mixture was found to be a light oil.

*Example XIII*

1,1-dimethyl-1-soyhydrazinium chloride was dissolved in aqueous solution and treated with potassium hexafluorophosphate. The resulting derivative melted at 172–175° C. with decomposition. The "soy" portion of the parent hydrazinium salt is a mixture of alkyl and alkenyl residues derived from soybean fatty acids having the approximate composition: 20% hexadecyl, 17% octadecyl, 26% ocetadecenyl, 37% octadecadienyl.

*Example XIV*

1,1-dimethyl-1-hexadecylhydrazinium chloride was dissolved in water and treated with an aqueous solution of potassium hexafluorophosphate. The resulting derivative melted under pressure at 95° C.

*Example XV*

1,1-dimethyl-1-octadecylhydrazinium chloride was dissolved in water and treated with potassium hexafluorophosphate. The resulting derivative melted at 167–172° C. with decomposition.

*Example XVI*

The procedure of Example XV was substantially repeated using 4-amino-4-cocomorpholinium chloride, where the "coco" residue varies from $C_8H_{17}$ to $C_{18}H_{37}$ but is predominantly $C_{12}H_{25}$. The hexafluorophosphate derivative thus obtained had a melting point of 137–141° C.

*Example XVII*

The procedure described in the preceding examples was substantially repeated using 4-amino-4-tallow-morpholinium chloride, where the "tallow" residue is a mixture including $C_{14}H_{29}$, $C_{16}H_{33}$, $C_{18}H_{35}$ and $C_{18}H_{37}$ in roughly a ratio of 1:12; 23:14 parts by weight. The resulting hexafluorophosphate derivative melted under pressure at 63–66° C.

*Example XVIII*

The procedure of the previous examples was substantially repeated using 1-methyl-bis-soyhydrazinium chloride, where the "soy" residue is the same as that described in Example XIII. The resulting hexafluorophosphate was a crude off-white paste.

*Example XIX*

A 1 g. portion of crude 1,1-dimethyl-1-(2-hydroxyethyl)hydrazinium chloride was dissolved in 5 cc. of water and added to freshly precipitated silver oxide made from 5 g. of silver nitrate. The reaction mixture was kept at room temperature for a period of one hour and then filtered. The filtrate showed the presence of chloride in trace quantities when tested. It was treated dropwise with 0.4 g. of $HPF_6$ as a 5% weight solution. The reaction mixture was kept at room temperature for a short period of time and then dried in vacuo to give a crude paste. The paste was slurried in isopropyl alcohol and dried. The slurrying step was repeated twice and the resulting crude product was recrystallized twice from isopropyl alcohol to give 0.15 g. of the novel 1,1-dimethyl-1-(2-hydroxyethyl)hydrazinium hexafluorophosphate. It appeared as a hygroscopic, crystalline mass melting at 52° C. and giving off liquid at about 80° C.

*Example XX*

A small portion of 1,1-diethyl-1-(2-benzylideneaminoethyl)hydrazinium chloride, when treated with water, partially hydrolyzed to form an oil layer, the novel 1,1-diethyl-1-(2-β-aminoethyl)hydrazinium chloride. This mixture of compounds was treated with sodium hexafluorophosphate to give a water soluble derivative.

My novel water soluble hexafluorophosphates are useful as additives in electroplating processes. For instance, an addition of a small amount of one of these hydrazinium salts to an electroplating solution results in the deposition of a clearer, brighter, more coherent covering film on the electroplated object. Moreover, these compounds are excellect dispersing agents for water insoluble components in electroplating.

I claim:

1. New chemical compounds having the general formula:

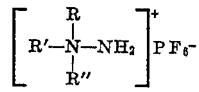

wherein R is a member selected from the group consisting of unsubstituted aliphatic hydrocarbon residues having less than 25 carbon atoms, phenyl, loweralkylphenyl, cyclohexyl, primary aminoloweralkyl, cyanoloweralkyl and benzylideneaminoloweralkyl radicals; R', when taken alone, is a member selected from the group consisting of unsubstituted aliphatic hydrocarbon residues having less than 25 carbon atoms and hydroxyloweralkyl radicals; R", when taken alone, is a member selected from the group consisting of loweralkyl and hydroxyloweralkyl radicals; and R' and R", when taken together with the N on which they are both substituents, form a morpholine ring.

2. Compounds according to claim 1 wherein R and R' are unsubstituted aliphatic hydrocarbon residues having less than 25 carbon atoms and R'' is a lower alkyl radical.

3. Compounds according to claim 1 wherein R is an aliphatic hydrocarbon residue having less than 25 carbon atoms and R' and R'' are taken together with the N on which they are both substituents to form a morpholine ring.

4. Compounds according to claim 1 wherein R is lower-alkylphenyl, R' is an unsubstituted aliphatic hydrocarbon residue having less than 25 carbon atoms and R'' is a loweralkyl radical.

5. Compounds according to claim 1 wherein R is phenyl, R' is an unsubstituted aliphatic hydrocarbon residue having less than 25 carbon atoms and R'' is a loweralkyl radical.

6. Compounds according to claim 1 wherein R is a cyanoloweralkyl radical, R' is an unsubstituted aliphatic hydrocarbon residue having less than 25 carbon atoms and R'' is a loweralkyl radical.

7. As a new chemical compound 1,1,1-trimethylhydrazinium hexafluorophosphate.

8. As a new chemical compound 4-amino-4-methyl-morpholinium hexafluorophosphate.

9. As a new chemical compound 1,1-dimethyl-1-(p-tolyl)-hydrazinium hexafluorophosphate.

10. As a new chemical compound 1,1-di-n-propyl-1-phenyl-hydrazinium hexafluorophosphate.

11. As a new chemical compound 1,1-dimethyl-1-(2-cyanoethyl) hydrazinium hexafluorophosphate.

No references cited.